Oct. 18, 1938.   R. SIMMON   2,133,581
PHOTOGRAPHIC DEVICE
Filed Sept. 17, 1936   3 Sheets-Sheet 1
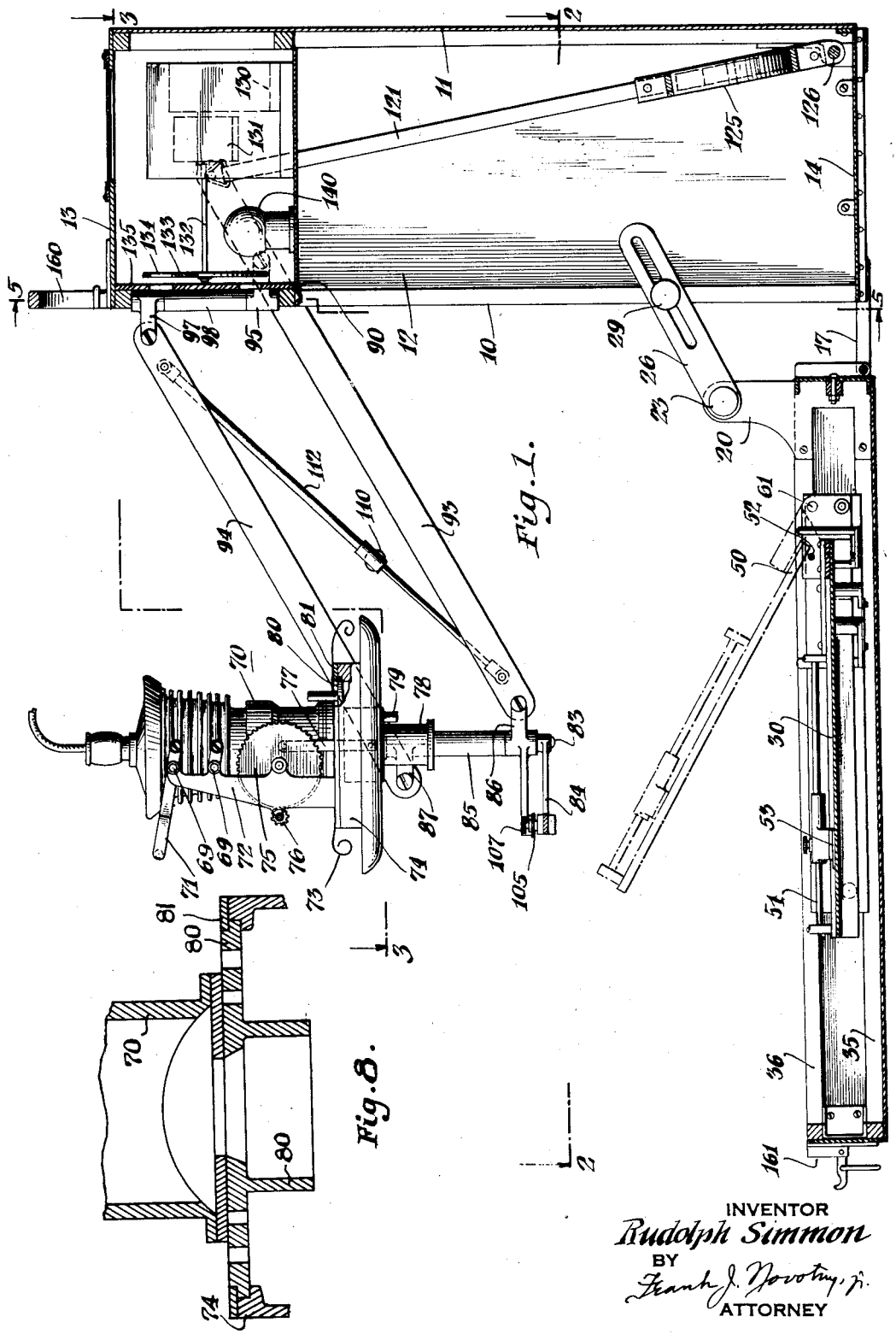
INVENTOR
Rudolph Simmon
BY
Frank J. Novotny, jr.
ATTORNEY Oct. 18, 1938.    R. SIMMON    2,133,581
PHOTOGRAPHIC DEVICE
Filed Sept. 17, 1936    3 Sheets-Sheet 2
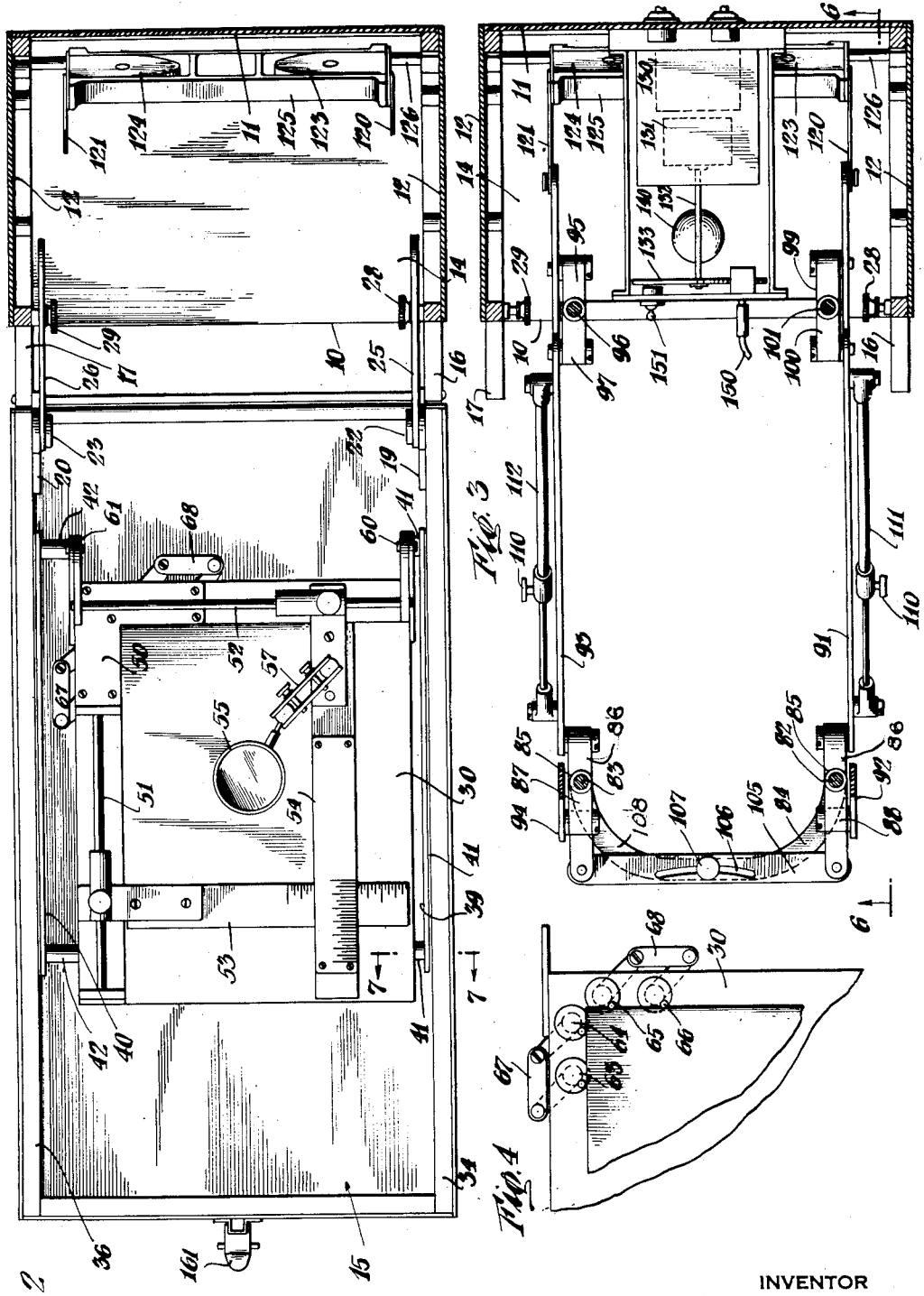
INVENTOR
Rudolph Simmon
BY Frank J. Novotny, Jr.
ATTORNEY

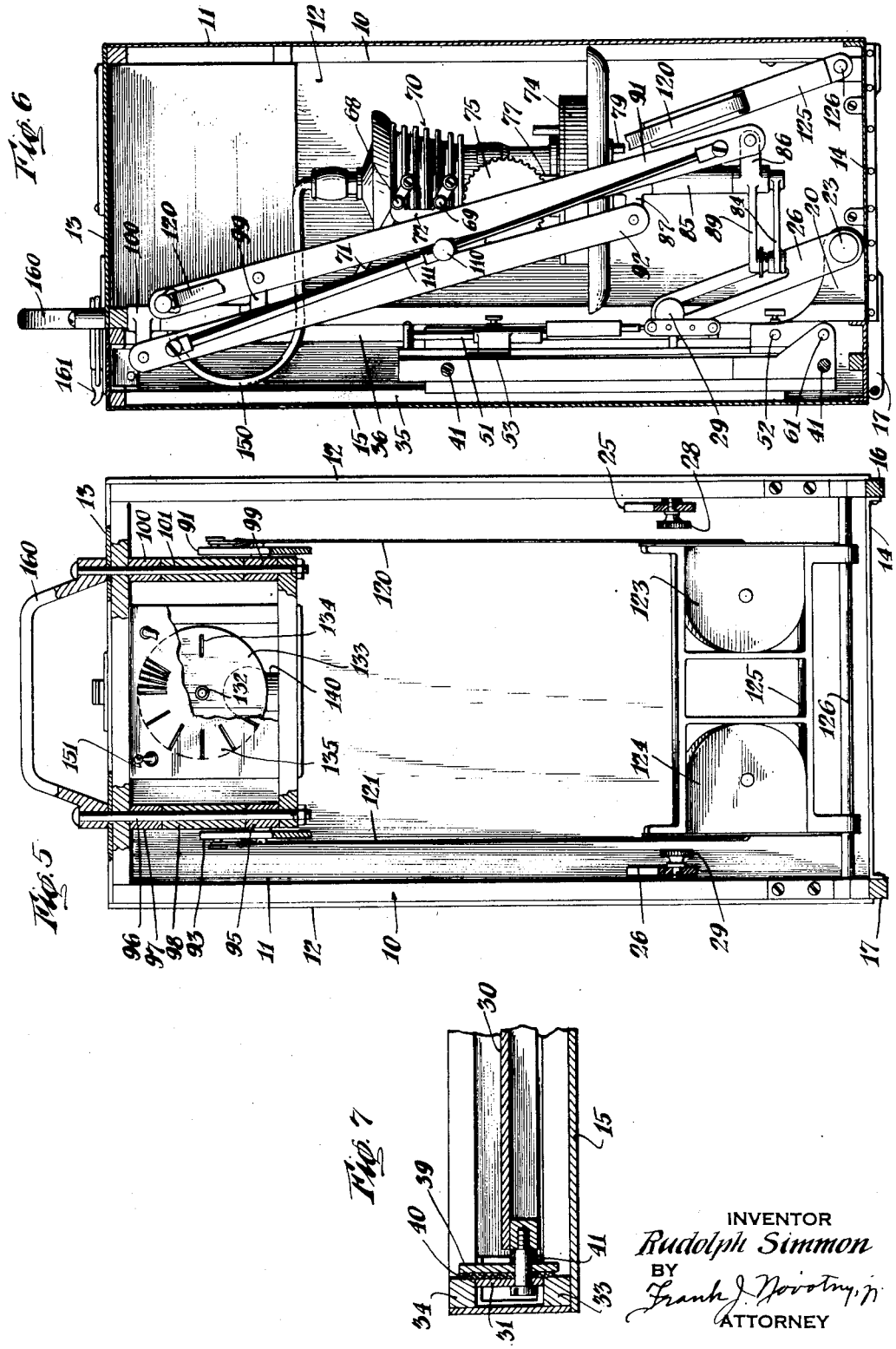

Patented Oct. 18, 1938

2,133,581

UNITED STATES PATENT OFFICE 2,133,581

PHOTOGRAPHIC DEVICE

Rudolph Simmon, New York, N. Y.

Application September 17, 1936, Serial No. 101,285

7 Claims. (Cl. 88—24)

This invention relates to a portable unitary photographic device. More particularly, it embraces an enlarging apparatus, preferably, but not exclusively for miniature negatives, having integrally associated therewith a synchronous electrically driven split or multi-second timer, a dark room lamp and an adjustable easel.

Heretofore, it has been necessary to provide a number of different instruments in order to print, satisfactorily, a series of exactly matching successive enlargements. Furthermore, even with the most modern equipment, precise and desirably perfect duplication of positives (an important matter in numerous cases) could not be attained without extremely great pains and often necessitating the cooperation of an assistant. This was due principally to the ineffective arrangement of the variously necessary units. Moreover, the necessary apparatus was usually so bulky and so ineptly arranged as to render its portability entirely impossible.

It is an object of this invention to overcome these defects and disadvantages found in enlarging devices heretofore used.

It is a further object of this invention to provide a highly efficient enlarger which is universally adaptable to negatives of a number of diverse sizes.

Still another object is to provide means whereby all the dark room devices may be rendered portable, compact, and accessible in every detail.

Another object is to provide a unique universally adjustable (horizontally, vertically, and rotatably) projector which is adapted to enlarge any part or desired portion of a negative.

A further object of this invention is to provide an easel having complete margin control which is unerringly square.

A still further object is to provide a micrometer adjustment for the projecting device for the purpose of obtaining sharp perfectly uniform and brief exposures.

Still further and other objects of this invention will readily suggest themselves to those versed in the related arts upon reading the following description illustrating a particular embodiment thereof.

In the drawings, corresponding parts are similarly numbered in order to avoid any confusion, and where repeated, these numbers have been shown in order to indicate more clearly the relationship of the various parts in the different drawings of the embodiment herein specifically described. A detailed description of the construction of such an embodiment, and the means and method of carrying out this invention will now be given.

In the drawings:

Figure 1 is a vertical section of the apparatus showing the cover opened and a portion of the apparatus including the projector in plan view and in operating position; this figure is taken on a median plane on a broken line passing at the left and a little to the front of the projecting apparatus, namely on the line 1—1 of Fig. 3, and therefore shows the projecting apparatus and the mechanism to the rear thereof in plan view.

Figure 2 is a horizontal section taken on the line 2—2 of Fig. 1 and shows a top plan view of the easel and of the margin control.

Figure 3 is a horizontal section taken, however, on the broken line 3—3 of Fig. 1 and shows in detail the mechanism for moving the projector on a horizontal plane (i. e., to and from the observer of Fig. 1).

Figure 4 is an enlarged view of the upper right hand corner of the easel of Fig. 2 with both the scales lifted up off the easel and shows the eccentric pins for correctly setting the margins for the photographic paper.

Figure 5 is a vertical section taken on the broken line 5—5 of Fig. 1 and shows the dial of the synchronous clock and lower down, the covers for the coil springs or leaf springs which keep the projector perfectly balanced in every one of its many positions.

Figure 6 is a vertical section of the apparatus when completely shut or closed, taken, however, on a line 6—6, Fig. 3, and showing the projector completely folded in the cabinet, the easel lowered to the hinged or bottom end of the lid and the lid snapped shut as by a lock on the top of the cabinet.

Figure 7 is a detailed view of the slide for the easel and is taken on the line 7—7 of Fig. 2, and Fig. 8 is a fragmentary vertical cross-sectional view showing the rotatable mounting of the projector on its support.

Referring now to the figures and more particularly to Figs. 1, 2, 3, 5 and 6, box 10 has a back 11, two sides 12, a top 13, bottom 14 and a lid 15. The lid 15 is hingedly mounted at one edge thereof to a projecting arm 16, 17 of the base 14, and has angularly disposed lugs 19, 20 to which are fastened by pivot members 22, 23 the slidable adjustable links 25, 26, the adjustable portion being fastened by thumb screws 28, 29.

The lid 15 has slidably movable therein (see Fig. 7 also) the easel 30 affixed to frictionally guided sleeves 31, 32 extending the length of the easel and frictionally sliding in the frame members 33 and 34, and 35 and 36, respectively; a plate, such as 39, 40 extending the length of the easel is provided to restrain the easel from lateral movement, composition spacers serving to reduce the friction of metal to metal rubbing. The easel is slidably affixed to the guide sleeves by bolts 41 and 42.

The paper holder 50 is L-shaped, having guide rods 51, 52 on which are slidably mounted the scale 53, 54 respectively. The focusing magnifier 55 is mounted by a double universal joint 57 to the scale 54, and enables one to obtain critical sharpness of the image with extreme ease.

In order to set the paper for printing an enlargement, the paperholder 50 is raised (broken line Fig. 1) by turning it upwards around the hinged joints 60, 61. This exposes the small eccentric lugs 63, 64 and 65, 66 fixed on disks which are linked as shown in Fig. 4 and operable by adjusting levers 67, 68 respectively; with this margin control a square edge is always easily obtainable and by shifting the levers 67 and 68, the width of the margin can be controlled, as the lugs 63, 64, 65 and 66 are the only elements protruding above the surface of the easel.

The projector 70 is mounted on a lever arm 71 which is fulcrumed on the supporting frame 72 at 69. By lowering lever arm 71 the projector 70 is raised and the negative 73 may then be inserted thereunder and projected on the easel for enlargement, the fully pressed film being held in place between the lower surface of the lamp housing and the supporting frame 74.

Also mounted on the frame 72 is the focusing gear 75 turned by a micrometer pinion 76 (provided with a knurled thumb screw head), an eccentrically disposed link 77 having at the lower end thereof the lens unit 78 slidably movable on pins (one of which is shown) 79 fixed on plate 80; this gear and pin system may be used for accurately adjusting for critical sharpness of the projected image by the cooperation of focusing magnifier 65 together with the adjustment of pinion 76.

The entire projector can be rotated as a unit by simply turning it on its axis, as the plate 80, Figures 1 and 8, holding the entire projector unit is rotatable within the supporting frame 74 and is held therein however by flange 81; this enables one to correct any trifling, but disturbing faults, such as an oblique horizon, very readily. The supporting frame 74 is held by two rods 82, 83 (see also Fig. 3) rigidly affixed thereto and to arched frame member 84. Sleeve 85 (loosely slipped over the rods 82, 83) serves to space the lever arms 86, 87 loosely journalled on rod 82 (Fig. 6) on one side and a similar sleeve serves to space the lever arms 86, 87 loosely journalled on rod 83 on the other side (Fig. 1). A pair of side arms 91, 92 are journalled to lever arms 86, 87 respectively, as shown; similarly a second pair of side arms 93, 94 (Fig. 1) are journalled to the other lever arms 86, 87, respectively. Arm 93 is fulcrumed to knuckle 95 which is freely rotatable on rod 96 and spaced from knuckle 97 (also freely rotatable on rod 96 to which arm 94 in fulcrumed) by sleeve 98 (Fig. 1).

In a similar manner arms 91 ant 92 are fulcrumed to knuckle 99 and 100 respectively, each knuckle being freely rotatable on rod 101 (Fig. 3).

In order to fix the projector at a desired position, the knurled screw 110 on the link 111, 112 connecting each pair of side arms (92, 91 and 93, 94 respectively) on both sides of the projector mechanism are tightened.

The upper end of each arm 91 and 93 as shown is connected to a spirally wound leaf spring 120, 121 respectively, the springs in turn being held in frame members 123, 124 respectively, set in the spring frame 125 which rocks on shaft 126. Springs 120, 121 serve to balance the weight of the projector and its several swivel arms so that the projector is readily swung into working position.

At the top of and inside of the box is a voltage reducer or transformer 130 and a synchronously driven motor or electrically driven clockwork 131, which by means of shaft 132 drives the disc 133 having a slot 134 cut therein to indicate seconds elapsed on the face of glass dial 135. Bulb 140 is a red, dark room lamp which casts a working light downward in order to light the space above the easel and simultaneously serves as a means of indicating seconds elapsed by shining on disc 133 and through slot 134 to light the dial 135 having slots at spaced intervals adapted to register with slot 134.

Wire 150 serves to convey a current from the transformer or voltage reducer to the auto-lamp in the projector housing; a separate line switch (not shown) serves to light and extinguish the projector lamp. Switch 151 lights dark room lamp 140 and causes motor or clockwork 131 to start and/or indicate intervals of a second or a number of seconds on the dial 135.

Lever arms 86 (Figs. 1 and 3) have extensions 89 which are joined by a link or cross arm 105 having a slit 106 cut therein and through which passes thumb screw 107 threaded into member 108 pivoted on rods 82 and 83. By loosening thumb screw 107 the entire projector assembly is shiftable from side to side (to and from the observer of Fig. 1) and tightening the thumb screw 107 again fixes the projector so as to be immovable in a sidewise direction.

The box or case is provided with a handle 160 and a snap lock 161 for safety in carrying the apparatus.

It is to be understood that the example herein given is merely illustrative and not limitative of the invention which may be variously otherwise embodied within the scope of the appended claims.

I claim:

1. A photographic enlarging apparatus comprising a casing, a cover for the same, a film support pivoted in said casing to allow shifting thereof in parallel planes, a projector including a projection lamp and lens system held on said support, said projector being adapted to be moved into and out of said casing, a paper holder in said cover in a position parallel to said support, and means for shifting the same to aline it with said projector when in operative position.

2. A photographic enlarging apparatus comprising a casing, a cover for the same, a film support pivoted in said casing to allow shifting thereof in parallel planes, a projector including a projection lamp and lens system held on said support, said projector being adapted to be moved into and out of said casing, a paper holder in said cover in a position parallel to said support, and means for shifting the same to aline it with said projector when in operative position, and means for folding said projector into said casing and for closing said cover, whereby all of the operating parts are contained in said casing.

3. A photographic enlarging apparatus comprising a casing, a cover for the same, a film support pivoted in said casing to allow shifting thereof in parallel planes, a projector including a projection lamp and lens system held on said support, said projector being adapted to be moved into and out of said casing, a paper holder in said cover in a position parallel to said support, and means for shifting the same to aline it with said projector when in operative position, and a spring arrangement held in said casing and connected with said support, whereby the weight of said projector is balanced.

4. A photographic enlarging apparatus comprising a casing, a cover for the same, a film support pivoted in said casing to allow shifting thereof in parallel planes, a projector including a projection lamp and lens system held on said support, said projector being adapted to be moved into and out of said casing, a paper holder in said cover in a position parallel to said support, means for shifting the same to aline it with said projector when in operative position, and means for lateral adjustment of said projector.

5. A photographic enlarging apparatus comprising a casing, a cover for the same, a film support pivoted in said casing to allow shifting thereof in parallel planes, a projector including a projection lamp and lens system rotatably mounted on said support, said projector being adapted to be moved into and out of said casing, a paper holder in said cover in a position parallel to said support, and means for shifting the same to aline it with said projector when in operative position.

6. A photographic enlarging apparatus comprising a casing, a cover for the same, a film support pivoted in said casing by parallel sets of bars to allow shifting thereof in parallel planes, a projector including a projection lamp and lens system held on said support, said projector being adapted to be moved into and out of said casing, a paper holder in said cover in a position parallel to said support, and means for shifting the same to aline it with said projector when in operative position.

7. A photographic enlarging apparatus comprising a casing, a cover for the same, a film support pivoted in said casing by parallel sets of bars to allow shifting thereof in parallel planes, a projector including a projection lamp and lens system held on said support, said projector being adapted to be moved into and out of said casing, a paper holder in said cover in a position parallel to said support, and means for shifting the same to aline it with said projector when in operative position, one of the bars of each set having an extension, and a spiral spring secured in said casing and having one end secured to said extension, whereby the weight of said projector is balanced.

RUDOLPH SIMMON.